US008498585B2

(12) United States Patent
Vandenameele

(10) Patent No.: US 8,498,585 B2
(45) Date of Patent: Jul. 30, 2013

(54) APPARATUS AND METHOD FOR REDUCING SELF-INTERFERENCE IN A RADIO SYSTEM

(75) Inventor: Patrick Vandenameele, Bertem (BE)

(73) Assignee: Huawei Technologies Co., Ltd., Shenzhen (CN)

( * ) Notice: Subject to any disclaimer, the term of this patent is extended or adjusted under 35 U.S.C. 154(b) by 792 days.

(21) Appl. No.: 12/507,206

(22) Filed: Jul. 22, 2009

(65) Prior Publication Data

US 2010/0022201 A1 Jan. 28, 2010

(30) Foreign Application Priority Data

Jul. 22, 2008 (GB) .................................. 0813417.3

(51) Int. Cl.
*H04B 1/44* (2006.01)
(52) U.S. Cl.
USPC ............. 455/78; 455/101; 455/102; 455/103; 455/114.2; 455/114.3
(58) Field of Classification Search
None
See application file for complete search history.

(56) References Cited

U.S. PATENT DOCUMENTS

| | | | |
|---|---|---|---|
| 5,691,978 A | 11/1997 | Kenworthy | |
| 7,155,179 B1 | 12/2006 | Rothenberg | |
| 7,349,505 B2 * | 3/2008 | Blount et al. ................. | 375/346 |
| 7,761,075 B2 * | 7/2010 | Cleveland et al. ............ | 455/296 |
| 7,869,527 B2 * | 1/2011 | Vetter et al. .................. | 375/259 |
| 2006/0120477 A1 * | 6/2006 | Shen et al. .................... | 375/267 |
| 2008/0107046 A1 | 5/2008 | Kangasmaa et al. | |
| 2008/0299932 A1 * | 12/2008 | Belogolovy et al. .......... | 455/296 |

FOREIGN PATENT DOCUMENTS

| | | |
|---|---|---|
| EP | 1926336 | 10/2008 |
| WO | 2008056224 | 5/2008 |

OTHER PUBLICATIONS

Ahmad Mirzaei and Hooman Darabi; A Low-Power WCDMA Transmitter with an Integrated Notch Filter, IEEE International Solid State Circuits Conference, Feb. 5, 2008, pp. 212-214.*
Search Report of British Patent Office regarding British Patent application No. GB0813417.3, Oct. 22, 2008.

* cited by examiner

*Primary Examiner* — Fayyaz Alam
*Assistant Examiner* — Mohammed Rachedine
(74) *Attorney, Agent, or Firm* — Leydig, Voit & Mayer, Ltd.

(57) ABSTRACT

Full duplex radio wireless systems and methods and especially transceivers for full duplex radio wireless systems with reduction of self-interference are described. MIMO (=multiple input multiple output several antennas for output and input) is used within one device with multiple antennas to remove self-interference in a proactive way. For example, a transceiver is described having self-interference suppression, comprising, within one transceiver device: two or more transmitters comprising one or more signal generators for transmitting transmit signals having transmit center frequencies in a selected first subchannel; and one or more receivers having receiver inputs for simultaneously receiving a desired receive signal in a second subchannel and an undesired accumulated interference signal due to said transmitted signals; and at least one of said transmitters also comprising a precompensation circuit that modifies the transmit signals such that said accumulated interference signal at the receiver(s) inputs is reduced.

19 Claims, 3 Drawing Sheets

US 8,498,585 B2

APPARATUS AND METHOD FOR REDUCING SELF-INTERFERENCE IN A RADIO SYSTEM

TECHNICAL FIELD OF THE INVENTION

This invention relates generally to full duplex radio wireless systems and methods and especially to the design of transceivers for full duplex radio wireless systems with reduction of self-interference.

BACKGROUND OF WE INVENTION

A communication system can be full duplex or half duplex. In a full duplex system each communicating transceiver can receive and transmit signals simultaneously, typically in distinct frequency bands (frequency division) or by using different codes (code division) or combinations of these. In contrast, in a half duplex system each transceiver receives and transmits signals in separate time periods, typically within a single frequency band. The former approach has several advantages due to its relaxed need for time synchronization, its higher efficiency due to lack of guard times, the avoidance of slot period related interference, cell planning advantages etc. Hence most current cellular standards have adopted the use of full duplex communication. However, a full duplex receiver is susceptible to a problem called "self-interference". Typically, full duplex transceivers resolve the self-interference problem by suppressing signals in the transmit frequency band at the receiver input, often requiring advanced, non-integrateable, expensive and bulky devices such as Surface Acoustic Wave (SAW) filters. Clearly, with the continuous drive towards lower cost and smaller footprint, the problem of reducing self-interference is more pressing than ever.

Secondly, MIMO techniques have been introduced due to the radio wireless channel environment existing in a mobile communication system is subject to inevitable errors. These can be due to several factors such as multipath interference, shadowing, propagation attenuation, time-varying noise, interference and fading, all of which result in a deterioration in the overall performance of the mobile communication system.

Generally, in order to reduce the information loss, various channel coding techniques are used to enhance system reliability. To improve performance beyond what is achievable with channel coding and to increase the communication system's spectral efficiency, diversity schemes are used for improving communication robustness even in the presence of fading. Diversity schemes are roughly classified into time, frequency and antenna/space diversity schemes. The antenna diversity scheme, which uses multiple antennas, is in turn classified into a receive antenna diversity scheme using a plurality of receive antennas (MISO), a transmit antenna diversity scheme using a plurality of transmit antennas (SIMO) and a Multiple Input Multiple Output (MIMO) scheme using a plurality of receive and transmit antennas at the transmitter and a receiver respectively. Due to the nature of the radio wireless propagation channel, the radio wireless channel between any pair of transmit-receive antennas is different, which results in so-called spatial diversity. Several factors are influencing the degree to which these antenna pairs are uncorrelated, and the better uncorrelated they are, the more received signal quality gain can be obtained using signal processing exploiting the signals received at the different antennas. As an example, in its most simple form the signal processing may consist of employing an antenna selection method in which some antennas having good channel conditions are selected from among the antennas of the transmitter or the receiver, and signals are transmitted/received through the selected antennas. In more complex schemes, the transmit side may deliberately introduce diversity and/or create known relationships between the signals transmitted on the different antennas. With data rate requirements steadily increasing while coverage expectations remain at similar levels to legacy systems, all of the above techniques are gradually being introduced in radio wireless communications systems, such as those used for cellular communications. Of particular relevance is that the introduction of these techniques comes at a cost and footprint penalty, both very sensitive parameters in the modern communications systems transceivers.

EP1926336 describes MIMO techniques to increase capacity and quality between plurality of users and a basestation. U.S. Pat. No. 5,691,978 relates to duplexing on the same band. It uses active cancellation techniques after the facts (post-cancellation) and does not rely on having multiple transmit antennas.

U.S. Pat. No. 7,155,179 describes a full duplex transceiver having a method for immunizing itself against self-jamming. It uses a centre frequency of jamming signal to down convert desired signal. It works for single antenna systems and requires significant dynamic range up to the high pass filter.

SUMMARY OF THE INVENTION

An object of the present invention to provide full duplex radio wireless systems and methods and especially transceivers for full duplex radio wireless systems with reduction of self-interference.

The present invention makes use of MIMO (=multiple input multiple output several antennas for output and input) within one device with multiple antennas to remove self-interference in a proactive way.

The present invention provides a novel implementation of radio wireless communication systems. Its advantages are particularly useful for communication systems involving full duplex communication and MIMO techniques. In the next paragraphs each of these aspects is elaborated upon. An advantage of the present invention is that it provides an active technique that employs multiple antennas and transmit chains to reduce the self-interference in a full duplex communications system, resulting in a synergistic effect.

The present invention provides a transceiver having self-interference suppression, comprising, within one transceiver device:

two or more transmitters comprising one or more signal generators for transmitting transmit signals having transmit center frequencies in a selected first subchannel; and one or more receivers having receiver inputs for simultaneously receiving a desired receive signal in a second subchannel and an undesired accumulated interference signal due to said transmitted signals; and at least one of said transmitters also comprising a precompensation circuit that modifies the transmit signals such that said accumulated interference signal at the receiver(s) inputs is reduced.

The present invention also provides a method of providing self-interference suppression for a transceiver, one transceiver device having two or transmitters comprising one or more signal generators for transmitting said transmit signals having transmit center frequencies in a selected first subchannel; and one or more receivers having receiver inputs for simultaneously receiving a desired receive signal in a second subchannel and an undesired accumulated interference signal due to said transmitted signals, the method comprising:

modifying the transmit signals such that said accumulated interference signal at the receiver(s) inputs is reduced.

The present invention also provides and integrated circuit or software for carrying out any of the methods of the present invention when executed on a processing engine.

The dependent claims define additional embodiments of the present invention.

DETAILED DISCUSSION OF PREFERRED EMBODIMENTS

Figure 1:
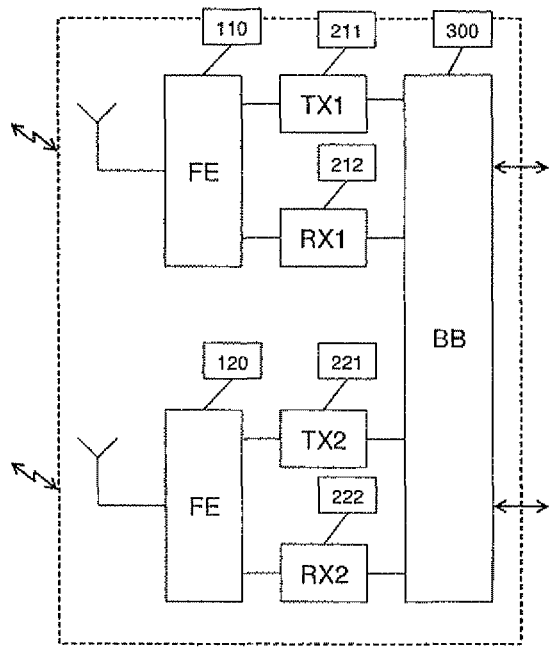
FIG. 1 illustrates an implementation of a multiple antenna radio wireless communication system according to an embodiment of the present invention.

In the following detailed description of the preferred embodiments, reference is made to the accompanying drawings, which form a part hereof, and within which are shown by way of illustration specific embodiments by which the invention may be practiced. The drawings described are only schematic and are non-limiting. In the drawings, the size of some of the elements may be exaggerated and not drawn on scale for illustrative purposes. Those skilled in the art will recognize that other embodiments may be utilized and structural changes may be made without departing from the scope of the invention.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. Thus, the scope of the expression "a device comprising means A and B" should not be limited to devices consisting only of components A and B. It means that with respect to the present invention, the only relevant components of the device are A and B.

The present invention provides a method and apparatus for suppressing self-interference in a full duplex transceiver by using at least two antennas and two associated transmit chains and by actively controlling the signals transmitted on those antennas such that the accumulated interference level at the receiver input(s) is reduced without affecting the total transmitted output power.

FIG. 1 illustrates an implementation of a multiple antenna radio wireless communication system. It contains a Front-End 10, RF transceiver consisting of a transmitter 211 and receiver 212 dedicated for the first antenna and a Front-End 102, RF transceiver 120 and consisting of a transmitter 221 and receiver 222 dedicated for the second antenna, as well as a baseband processor 300. The Baseband processor operates on signals that are no longer modulated radio frequencies, but merely modulated baseband frequencies. As an explanatory note and not to be interpreted as a limitation to the generality of the invention, the Front-End typically consist of band filters, amplifiers, switches and diplexers and several passive components or micro-strip lines, but does not involve any frequency translation, whereas the RF transceivers do involve frequency generation, frequency translation, amplification and some analog baseband processing mainly for further filtering and amplification of the signals. In the particular case of a full duplex multiple antenna system, the receivers 212 and 222 are to be employed at the same time as the transmitters 211 and 221, resulting in self-interference from the latter onto the former. Typically the transmission and reception takes place in different frequency bands and the Front-Ends 110 and 120 contain filtering circuits to reduce the self-interference. However, the implementation of both FE and RF circuits is challenging from both a cost and performance point of view, especially as multiple antenna technologies are being employed. This issue is addressed by the present invention.

Figure 2:
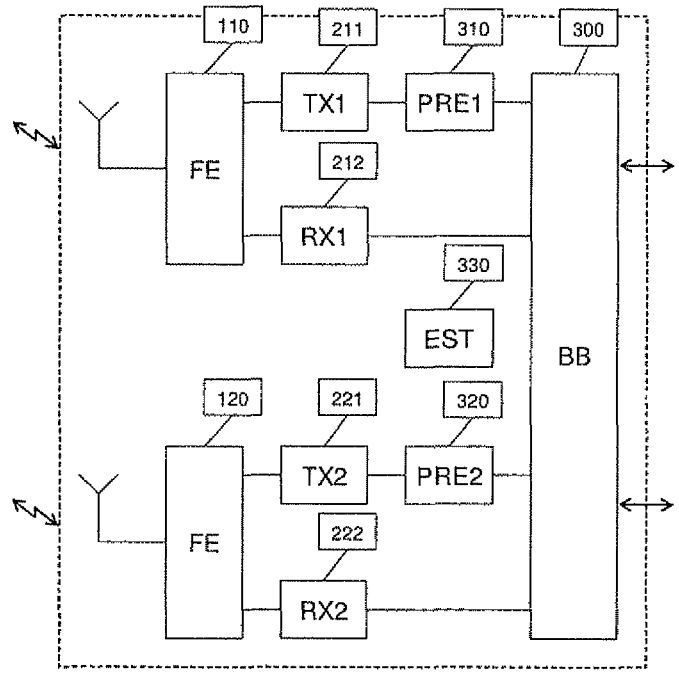
FIG. 2 illustrates an implementation of a multiple antenna radio wireless communication system according to an embodiment of the present invention.

Briefly, in a preferred embodiment, as shown in FIG. 2, the proposed method and apparatus actively reduces the self-interference from the transmitters onto the receivers by pre-processing the signals to be transmitted using a preprocessing unit for each of the transmitting paths, respectively 310 and 320. In the event that the preprocessing is to be adjusted dynamically, e.g. because of varying frequency bands, channels, reflection coefficients, an estimation unit 330 can be used to adaptively estimate the optimal preprocessing operation to be executed in 310 and 320.

As an example implementation a 2×2 MIMO system was simulated with a particular estimation unit based on a singular value decomposition.

With $h_{ij}$ the interference caused by TXi (with i=1,2) on RXi (with i=1,2) and assuming a narrowband frequency flat propagation between the interference sources and sinks, the self-interference matrix can be represented as:

$$H = \begin{bmatrix} h_{1,1} & h_{1,2} \\ h_{2,1} & h_{2,2} \end{bmatrix}$$

Typically, $h_{1,1}$ and $h_{2,2}$ are very similar in magnitude and larger than $h_{1,2}$ and $h_{2,1}$, because the interference of a transmitter on its associated receiver is larger than its interference on the other receiver is. On the other hand, the phases of the different coefficients can take arbitrary values, depending on frequency, layout, electro magnetic environment etc.

In this example implementation the estimation unit first estimates the self-interference matrix based on a training sequence. Subsequently it finds precompensation coefficients by computing its singular value decomposition, as in:

$$H = U \cdot \Sigma \cdot V^*$$

where U is an 2-by-2 unitary matrix, the matrix Σ is 2-by-2 with nonnegative numbers on the diagonal and zeros off the diagonal, and V* denotes the conjugate transpose of V, a 2-by-2 unitary matrix. The matrix V thus contains a set of orthonormal "input" or "analysing" basis vector directions for H. The matrix U contains a set of orthonormal "output" basis vector directions for H. The matrix Σ contains the singular values, which can be thought of as scalar "gain controls" by which each corresponding input is multiplied to give a corresponding output.

Now, it can be shown that the right singular vector of H corresponding to the smallest singular value minimizes the 2-norm of Y=H·x. Or in other words, using x as a precompensation vector, will result in Y as the effective self-interference matrix, rather than H, and will in all cases result in a reduced self-interference power.

Figure 3:
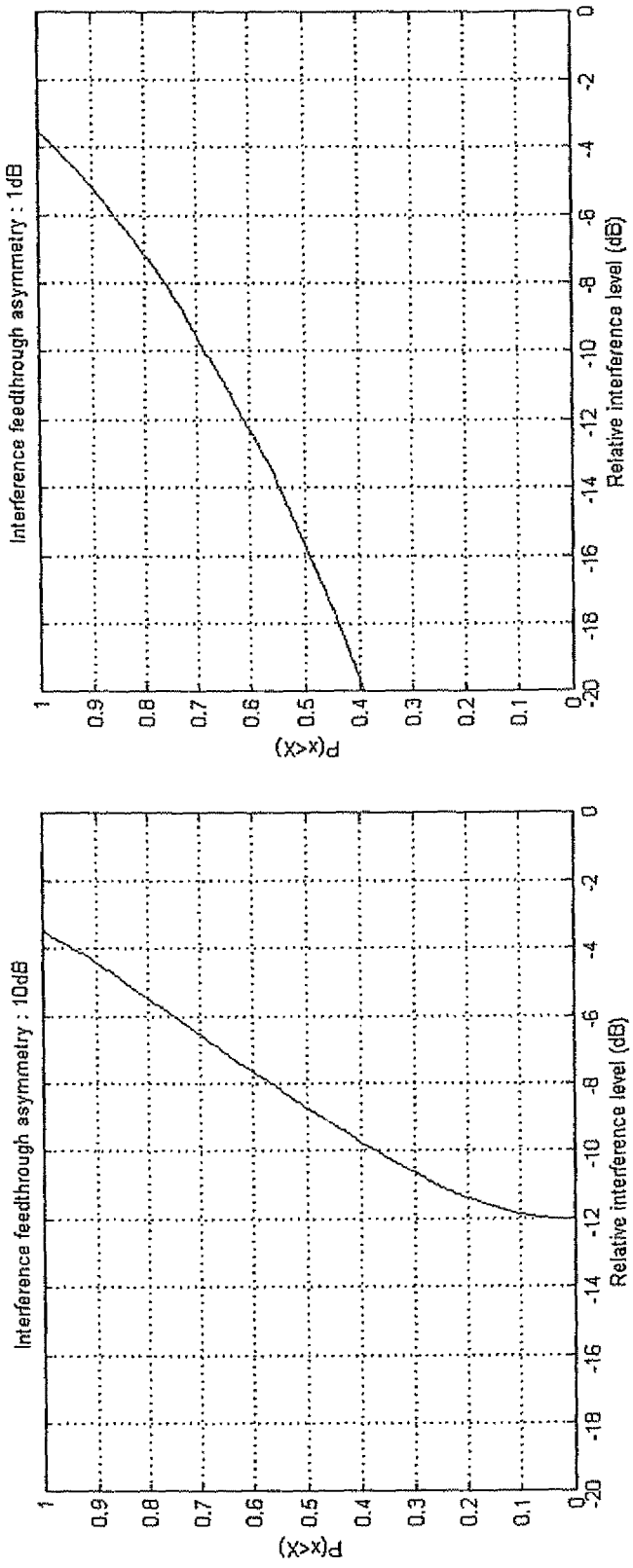
FIG. 3 shows simulation results.

The resulting performance improvement on the interference level is illustrated in FIG. 3. It shows two graphs, one for the case in which 10 dB is the relative level of interference to the associated antenna vs. the other, and another for the case in which it is 1 dB. The graphs show the cumulative probability density of the achieved interference level improvement in each case.

The simulation results shows that on average a gain of about 9 dB resp. 16 dB is achieved over the interference level that would be present at the receiver inputs without using the proposed precompensation technique. The difference in achievable gain between the two cases can be explained by the significant diagonal bias in the latter case, resulting in less spread in its singular values. Clearly, significant gain can be made by deliberately optimizing self-interference matrix.

Therefore, another embodiment of the invention involves that the self-interference matrix is deliberately optimized for the self-interference suppression to work more effectively. This can be done in at least the two following ways. A first way is to design the Front-End and antenna matching circuitry such that it results in an interference matrix with a phase relationship yielding one of the better points in the above graphs. This can result in interference rejection gains of up to 12 dB and beyond 50 dB for the resp. cases cited above. A second way is to deliberately leak more power from the adjacent transmitter such that it yields non-balanced singular values. This could for instance result in a shift from the 10 dB relative interference level to the 1 dB relative interference level, with consequent improvement in interference suppression capability.

In another embodiment, the algorithms used for the self-interference reducing estimator and precompensation circuit may be modified from the example given above in terms of the optimization criterion employed. The following are possible alternate optimization criteria: a) minimizing the maximum interference power occurring in any of the receivers, b) minimizing the minimum interference power occurring in any of the receivers, c) minimizing the bit or packet error rate occurring in any of the receivers and d) minimizing the overall bit or packet error rate.

In another embodiment, the algorithms used for the self-interference reducing estimator and precompensation circuit may be modified from the example given above in terms of extending it to cases where the interference propagation is better modeled by wideband non-frequency flat interference matrices rather than the narrowband frequency flat assumption used in the example given above. This may involve the use of time-domain or frequency-domain equalizers to achieve a precompensation for a wider frequency range than the scalar precompensation used in the example above. This may also involve the use of or modification of Orthogonal Frequency Division Multiplexing and/or Single-Carrier Frequency Domain transmission algorithms in the baseband processor such that the precompensation is done on a carrier-by-carrier basis.

In another embodiment, the number of transmitters and receivers involved is increased to further improve the effectiveness of the self-interference suppression.

In another embodiment, the estimator and pre-compensation circuits are operating in an adaptive way, continuously tracking and compensating the self-interference transfer functions.

In another embodiment, the estimator and pre-compensation circuits can take into account transmit diversity algorithms such as delay diversity, space time coding algorithms, and the use of Alamouti codes in specific.

It should be pointed out that the above description is in no way limiting towards the implementation aspects of the estimator and precompensation circuits. Without loss of generality, they could be implemented in the baseband processor, mixed signal circuitry, mixers, synthesizers, power amplifier drivers, variable gain amplifiers, front-end circuits etc.

Although, the present invention may be implemented in hardware circuits, some parts can be implemented in software in any computer language, run by conventional processing hardware such as a general purpose microprocessor, or application specific integrated circuits for example. For example, embodiments of the present invention may be implemented as hardware, computer software, or combinations of both. The present invention includes use of a general purpose processor, an embedded processor, an application specific integrated circuit (ASIC), a field programmable gate array (FPGA) or other programmable logic device, discrete gate or transistor logic, discrete hardware components, or any combination designed to perform the functions described herein. A processor may also be implemented as a combination of computing devices, e.g., a combination of an FPGA and a microprocessor, a plurality of microprocessors, one or more microprocessors in conjunction with an FPGA, or any other such configuration.

For example, the present invention may be implemented as an integrated circuit. The integrated circuit is for providing self-interference suppression within one transceiver device that comprises two or more transmitters having one or more signal generators for transmitting transmit signals with transmit center frequencies in a selected first subchannel, and one or more receivers having receiver inputs for simultaneously receiving a desired receive signal in a second subchannel and an undesired accumulated interference signal due to the transmitted signals. The integrated circuit comprises a precompensation function that modifies transmit signals in the transceiver such that an accumulated interference signal at the receiver(s) inputs is reduced.

The integrated circuit may be adapted to generate the transmit signals, the two or more transmitters being coupled to the integrated circuit.

The integrated circuit may be adapted to modify the amplitude and phase of the transmit signals or to split the transmit signals in frequency bands and to modify the amplitude and phase of the split transmit signals in each of the frequency bands.

The integrated circuit may include an estimation function that is used to help determine the precompensation function operation.

The integrated circuit may be adapted to adjust the precompensation function dynamically and the estimation function can be used to adaptively determine the optimal precompensation function operation.

The integrated circuit may be adapted such that the estimation function is adapted to estimate the transfer function of the transmitted transmit signals onto the receiver input and to model it as a linear relationship, resulting in a propagation matrix; the precompensation function also being adapted to use the right singular vector of the associated propagation matrix.

For example, in accordance with another embodiment of the present invention a baseband processor may be included in a processing engine having a Central Processing Unit ("CPU"), such as an embedded processor or a conventional microprocessor of which a Pentium processor supplied by Intel Corp. USA is only an example, and a number of other units interconnected via bus system. The bus system may be any suitable bus system. The processing engine includes at least one memory. Memory may include any of a variety of data storage devices known to the skilled person such as random-access memory ("RAM"), read-only memory ("ROM"), non-volatile read/write memory such as a solid state memory or a hard disc as known to the skilled person. For example, processing engine may further include random-access memory ("RAM"), read-only memory ("ROM"), as well as a display adapter for connecting system bus to a video display, and an optional input/output (I/O) adapter for connecting peripheral devices to the system bus. The video display can be any suitable display device such as an OLED or an LCD display well-known in the art of mobile telephone hardware.

In addition, the processing engine can include a control program that resides within memory storage. The control program contains instructions that when executed on the CPU allow the computer to carry out the operations described with respect to any of the methods of the present invention.

Figure 4:
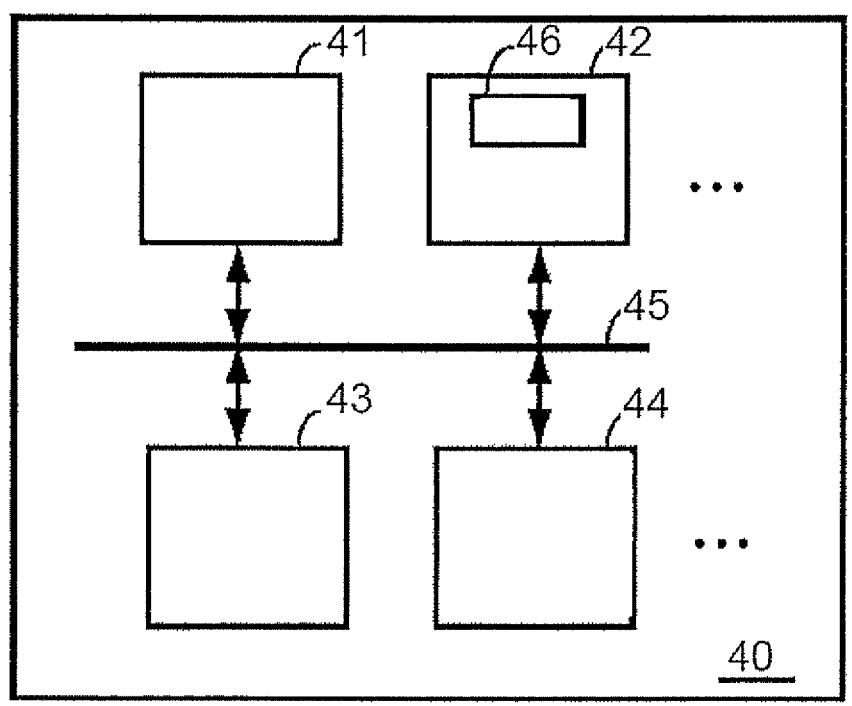
FIG. 4 shows an exemplary configuration of a processing system.

FIG. 4 shows one configuration of processing system 40 that includes at least one customisable or programmable processor 41 coupled to a memory subsystem 42 that includes at least one form of memory, e.g., RAM, ROM, and so forth. It is to be noted that the processor 41 or processors may be a general purpose, or a special purpose processor, and may be for inclusion in a device, e.g. a chip that has other components that perform other functions. Thus, one or more aspects of the method according to embodiments of the present invention can be implemented in digital electronic circuitry, or in computer hardware, firmware, software, or in combinations of them. The processing system may include a storage subsystem 43 that has solid state memory or a disk drive and/or a port for a solid state memory such as a USB memory. In some implementations, a display system, a keyboard, and a pointing device may be included as part of a user interface subsystem 44 to provide for a user to manually input information, such as parameter values. The various elements of the processing system 40 may be coupled in various ways, including via a bus subsystem 45 shown in FIG. 4 for simplicity as a single bus, but which will be understood to those in the art to include a system of at least one bus. The memory of the memory subsystem 42 may at some time hold part or all (in either case shown as 46) of a set of instructions that when executed on the processing system 40 implement the steps of the method embodiments described herein.

The present invention also provides a computer program product for carrying out the method of the present invention and this can reside in any suitable memory. However, it is important that while the present invention has been, and will continue to be, that those skilled in the art will appreciate that the mechanisms of the present invention are capable of being distributed as a computer program product in a variety of forms, and that the present invention applies equally regardless of the particular type of signal bearing media used to actually carry out the distribution. Examples of computer readable signal bearing media include: recordable type media such as floppy disks and CD ROMs and transmission type media such as digital and analogue communication links.

Accordingly, the present invention also includes a software product which when executed on a suitable computing device carries out any of the methods of the present invention. The software may be adapted to provide self-interference suppression for a transceiver. The software may be adapted to modify transmit signals such that an accumulated interference signal at the receiver(s) inputs is reduced. The software may also be adapted to modify the transmit signals by modifying the amplitude and phase of the transmit signals.

The software may be adapted to modifying the transmit signals by splitting the transmit signals in frequency bands and modifying the amplitude and phase of the split transmit signals in each of the frequency bands.

The software may be adapted so that the modification of the transmit signals is adjusted dynamically.

The software may also be adapted to estimate the transfer function of the transmitted transmit signals onto the receiver input and to model it as a linear relationship, resulting in a propagation matrix; and to modify the transmit signals by the right singular vector of the associated propagation matrix.

Suitable software can be obtained by programming in a suitable high level language such as C and compiling on a suitable compiler for the target computer processor.

Numerous other variations will also be apparent to one of ordinary skill in the art. It will therefore be appreciated by those of ordinary skill in the art that the invention can be embodied in other specific forms without departing from its spirit or essential character. The presently disclosed embodiments are therefore considered in all respects to be illustrative and not restrictive. The scope of the invention is indicated by the appended claims, and all changes which come within the meaning and range of equivalents thereof are intended to be embraced therein.

The invention claimed is:

1. A transceiver for self-interference suppression, comprising, within one transceiver device:
   two or more transmitters comprising one or more signal generators for transmitting transmit signals having transmit center frequencies in a selected first subchannel, wherein each of the two or more transmitters is dedicated for a different antenna; and
   a receiver corresponding to the same antenna as one of the two or more transmitters and having receiver inputs for simultaneously receiving a desired receive signal in a second subchannel and an undesired accumulated interference signal due to said transmitted signals from the two or more transmitters;
   wherein at least one of said transmitters that is associated with an antenna other than the antenna corresponding to the receiver is associated with a precompensation circuit that modifies the transmit signals such that said accumulated interference signal at the receiver inputs is reduced.

2. The transceiver of claim 1, further comprising:
   a baseband processor generating a transmit signal, the two or more transmitters being coupled to said baseband processor.

3. The transceiver of claim 1, wherein:
   the precompensation circuit is adapted to modify the amplitude and phase of the transmit signals.

4. The transceiver of claim 1, wherein:
   the precompensation circuit is adapted to split the transmit signals in frequency bands and modifies the amplitude and phase of the split transmit signals in each of the frequency bands.

5. The transceiver of claim 1, wherein:
   an estimation circuit is used to help determine the precompensation circuit operation.

6. The transceiver of claim 1, wherein:
the precompensation circuit is adjusted dynamically and an estimation circuit is used to adaptively determine the optimal precompensation circuit operation.

7. The transceiver of claim 5, wherein:
the estimation circuit is adapted to estimate the transfer function of the transmitted transmit signals onto the receiver input and to model it as a linear relationship, resulting in a propagation matrix; the precompensation circuit also being adapted to use the right singular vector of the associated propagation matrix.

8. A method of providing self-interference suppression for a transceiver, wherein one transceiver device includes two or transmitters comprising one or more signal generators for transmitting said transmit signals having transmit center frequencies in a selected first subchannel, wherein each of the two or more transmitters is dedicated for a different antenna; and, a receiver corresponding to the same antenna as one of the two or more transmitters and having receiver inputs for simultaneously receiving a desired receive signal in a second subchannel and an undesired accumulated interference signal due to said transmitted signals from the two or more transmitters, the method comprising:
modifying one or more of the transmit signals that are associated with antennas other than the antenna corresponding to the receiver such that said accumulated interference signal at the receiver inputs is reduced.

9. The method of claim 8, wherein modifying the transmit signals includes modifying the amplitude and phase of the transmit signals.

10. The method of claim 8, wherein:
modifying the transmit signals includes splitting the transmit signals in frequency bands and modifying the amplitude and phase of the split transmit signals in each of the frequency bands.

11. The method of claim 8, wherein:
modifying the transmit signals is adjusted dynamically.

12. The method of claim 11, further comprising:
estimating the transfer function of the transmitted transmit signals onto the receiver input and modeling it as a linear relationship, resulting in a propagation matrix; and modifying the transmit signals uses the right singular vector of the associated propagation matrix.

13. A computer program product comprising code segments, which when executed on a processing engine, execute a method of providing self-interference suppression for a transceiver, wherein one transceiver device includes two or transmitters comprising one or more signal generators for transmitting said transmit signals having transmit center frequencies in a selected first subchannel, wherein each of the two or more transmitters is dedicated for a different antenna; and, a receiver corresponding to the same antenna as one of the two or more transmitters and having receiver inputs for simultaneously receiving a desired receive signal in a second subchannel and an undesired accumulated interference signal due to said transmitted signals from the two or more transmitters, the method comprising:
modifying one or more of the transmit signals that are associated with antennas other than the antenna corresponding to the receiver such that said accumulated interference signal at the receiver inputs is reduced.

14. The computer program product of claim 13, further comprising code segments adapted for modifying the transmit signals by modifying the amplitude and phase of the transmit signals.

15. The computer program product of claim 13, further comprising code segments adapted for modifying the transmit signals by splitting the transmit signals in frequency bands and modifying the amplitude and phase of the split transmit signals in each of the frequency bands.

16. The computer program product of claim 13, further comprising code segments adapted for dynamically adjusting the modification of the transmit signals.

17. The computer program product of claim 13, further comprising code segments adapted for estimating the transfer function of the transmitted transmit signals onto the receiver input and modeling it as a linear relationship, resulting in a propagation matrix; and modifying the transmit signals uses the right singular vector of the associated propagation matrix.

18. A machine readable signal storage medium storing the computer program product of claim 13.

19. An integrated circuit for self-interference suppression for use with a transceiver, whereby within one transceiver device there is provided two or more transmitters comprising one or more signal generators for transmitting transmit signals having transmit center frequencies in a selected first subchannel, wherein each of the two or more transmitters is dedicated for a different antenna; and, a receiver corresponding to the same antenna as one of the two or more transmitters and having receiver inputs for simultaneously receiving a desired receive signal in a second subchannel and an undesired accumulated interference signal due to said transmitted signals from the two or more transmitters, the integrated circuit comprising:
a unit configured to implement a precompensation function that modifies one or more of the transmit signals that are associated with antennas other than the antenna corresponding to the receiver such that said accumulated interference signal at the receiver inputs is reduced.

* * * * *

UNITED STATES PATENT AND TRADEMARK OFFICE
CERTIFICATE OF CORRECTION

PATENT NO.         : 8,498,585 B2                                                    Page 1 of 1
APPLICATION NO.    : 12/507206
DATED              : July 30, 2013
INVENTOR(S)        : Patrick Vandenameele It is certified that error appears in the above-identified patent and that said Letters Patent is hereby corrected as shown below:

Title Page, item (57), Abstract, line 4 "multiple output several antennas for output" should read -- multiple output = several antennas for output --.

In the Claims:

Claim 8, Column 9, Lines 13-14 "two or transmitters comprising one or more" should read -- two or more transmitters comprising one or more --.

Claim 13, Column 9, Lines 47-48 "two or transmitters comprising one or more" should read -- two or more transmitters comprising one or more --.

Signed and Sealed this
Seventeenth Day of September, 2013

Teresa Stanek Rea
*Deputy Director of the United States Patent and Trademark Office*